(12) United States Patent
Romero, Jr. et al.

(10) Patent No.: US 12,547,964 B1
(45) Date of Patent: Feb. 10, 2026

(54) GAMIFIED MEMBER ASSESSMENT AND IMPROVEMENT SYSTEMS AND METHODS

(71) Applicant: United Services Automobile Association (USAA), San Antonio, TX (US)

(72) Inventors: Jose L. Romero, Jr., San Antonio, TX (US); Andre Rene Buentello, San Antonio, TX (US); Matthew Robert Byrd, Boerne, TX (US); Mounica Urity, San Antonio, TX (US); Sayeef Rahim, Allen, TX (US); Timothy Blair Chalmers, San Antonio, TX (US); Robert Lee Black, San Antonio, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 93 days.

(21) Appl. No.: 18/059,756

(22) Filed: Nov. 29, 2022

Related U.S. Application Data (60) Provisional application No. 63/284,351, filed on Nov. 30, 2021.

(51) Int. Cl.
*G06Q 10/0639* (2023.01)
*G06Q 30/0202* (2023.01)
*G06Q 30/0207* (2023.01)

(52) U.S. Cl.
CPC ... *G06Q 10/06398* (2013.01); *G06Q 30/0202* (2013.01); *G06Q 30/0207* (2013.01)

(58) Field of Classification Search
CPC ............................................... G06Q 10/06398
See application file for complete search history.

(56) References Cited

U.S. PATENT DOCUMENTS

| | | | |
|---|---|---|---|
| 2014/0195272 A1* | 7/2014 | Sadiq | G06Q 40/08 705/4 |
| 2016/0063532 A1* | 3/2016 | Loeb | G06F 40/205 705/14.25 |
| 2017/0296919 A1* | 10/2017 | Margiotta | A63F 13/46 |
| 2020/0011699 A1* | 1/2020 | Mendla | G01C 21/3453 |
| 2022/0153280 A1 | 5/2022 | Ferguson et al. | |
| 2023/0385771 A1* | 11/2023 | Lindy | G06F 16/955 |
| 2024/0169799 A1* | 5/2024 | Palmisano | G07F 17/3255 |

* cited by examiner

*Primary Examiner* — Dylan C White
(74) *Attorney, Agent, or Firm* — Fletcher Yoder P.C.

(57) ABSTRACT

Systems and method described herein include a member assessment and improvement system configured to receive data relating to personal activity of one or more members of an organization; to assess performance of the personal activity of the one or more members based at least in part on the data relating to the personal activity; to generate game-related data based at least in part on the performance of the personal activity of the one or more members; and to transmit one or more command signals to one or more game applications being executed by one or more electronic devices associated with the one or more members to display the game-related data via the one or more game applications.

20 Claims, 7 Drawing Sheets

GAMIFIED MEMBER ASSESSMENT AND IMPROVEMENT SYSTEMS AND METHODS

CROSS-REFERENCE TO RELATED APPLICATION

This application claims priority to and the benefit of U.S. Provisional Application No. 63/284,351, entitled "GAMIFIED MEMBER ASSESSMENT AND IMPROVEMENT SYSTEMS AND METHODS," filed Nov. 30, 2021, which is hereby incorporated by reference in its entirety for all purposes.

BACKGROUND

The present disclosure relates generally to systems and methods for assessing and improving desirable behaviors for members in a gamified manner.

Incentivizing positive personal activity in members of an organization is important to ensure the effectiveness of the personal activity and, in certain situations, to further the goals of the organization itself. For example, incentivizing safe driving habits of drivers that are insured by a particular insurance company can not only keep the drivers relatively safe, but also reduce insurance premiums of the drivers as well as insurance costs on the part of the insurance company. However, often times, the members of the organization may find the procedures for receiving such incentives to be relatively boring, and may not engage in such procedures as actively as desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a member assessment and improvement system is configured to receive data relating to personal activity of one or more members of an organization. The member assessment and improvement system is also configured to assess performance of the personal activity of the one or more members based at least in part on the data relating to the personal activity. The member assessment and improvement system is further configured to generate game-related data based at least in part on the performance of the personal activity of the one or more members. In addition, the member assessment and improvement system is configured to transmit one or more command signals to one or more game applications being executed by one or more electronic devices associated with the one or more members to display the game-related data via the one or more game applications.

In one embodiment, a method includes receiving, via a member assessment and improvement system, data relating to personal activity of one or more members of an organization. The method also includes assessing, via the member assessment and improvement system, performance of the personal activity of the one or more members based at least in part on the data relating to the personal activity. The method further includes generating, via the member assessment and improvement system, game-related data based at least in part on the performance of the personal activity of the one or more members. In addition, the method includes transmitting, via the member assessment and improvement system, one or more command signals to one or more game applications being executed by one or more electronic devices associated with the one or more members to display the game-related data via the one or more game applications.

In one embodiment, one or more non-transitory computer-readable memory media include processor-executable instructions stored thereon. The processor-executable, when executed by one or more processors, cause the one or more processors to receive data relating to personal activity of one or more members of an organization; to assess performance of the personal activity of the one or more members based at least in part on the data relating to the personal activity; to generate game-related data based at least in part on the performance of the personal activity of the one or more members; and to transmit one or more command signals to one or more game applications being executed by one or more electronic devices associated with the one or more members to display the game-related data via the one or more game applications.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a control system (i.e., solely by the control system, without human intervention).

The embodiments described herein are related to a gamified member assessment and improvement system that is configured to assess and improve performance of personal activity (e.g., actions related to financial readiness, actions related to home ownership/domicile patterns, good diving habits, and so forth) of members of particular organizations. For example, in certain embodiments, the organization may be a company and the members may be employees of the company. Alternatively, in certain embodiments, the organization may be an insurance company and the members may be people insured by the insurance company. Regardless, the gamified member assessment and improvement system described herein is intended to provide a centralized system that may monitor performance of certain personal activity of the members to help improve the performance of certain personal activity tasks that are believed to be desirable. Specifically, it is believed that gamifying the assessment of certain personal activity tasks may incentivize the members to improve their performance of the personal activity tasks because they enjoy the gamified nature of the assessment.

Figure 1:
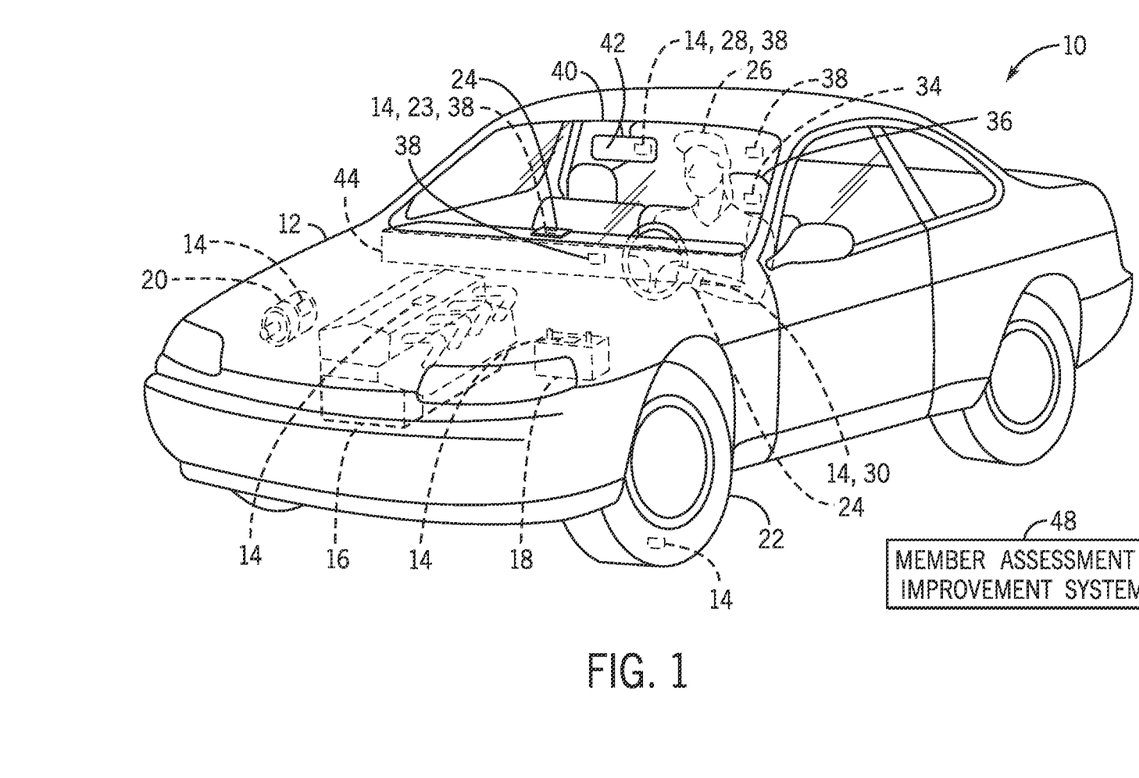
FIG. 1 is a perspective view of a system including a vehicle that may be used as part of a gamified member assessment and improvement system, in accordance with embodiments of the present disclosure.

FIG. 1 is a perspective view of a system 10 including a vehicle 12 that may be used as part of a gamified member assessment and improvement system. While the vehicle 12 is illustrated as an automobile, it should be understood that the present disclosure applies to any suitable vehicle, such as a truck, motorcycle, commercial vehicle, recreational vehicle, all-terrain vehicle, boat, airplane, snowmobile, and so forth. In certain embodiments, the vehicle 12 may include one or more vehicle operation sensors 14 that detect or determine whether the vehicle 12 is in operation. For example, in certain embodiments, the vehicle operation sensors 14 may include an engine sensor that monitors whether an engine 16 of the vehicle 12 is running. In certain embodiments, the vehicle operation sensors 14 may include a battery sensor that detects whether a battery 18 of the vehicle 12 is being drained (e.g., to start the vehicle 12). In addition, in certain embodiments, the vehicle operation sensors 14 may include an alternator sensor that determines whether an alternator 20 of the vehicle 12 is attempting to start the vehicle 12. In addition, in certain embodiments, the vehicle operation sensors 14 may include a wheel sensor that detects whether a wheel 22 of the vehicle 12 is rotating.

In other embodiments, other vehicle operation sensors 14 (such as front or rear facing cameras 38) of the vehicle 12 may be used to determine that the vehicle 12 is in operation. Additionally or alternatively, vehicle operation sensors 14 separate from the vehicle 12 may be used to determine that the vehicle 12 is in operation. For example, in certain embodiments, the vehicle operation sensors 14 may include location sensors, orientation sensors, and/or motion sensors of a mobile electronic device 24 that determine, based on the sensed location, orientation, and/or motion (e.g., calculated velocity and/or acceleration) of the mobile electronic device 24, that a member 26 is in the vehicle 12 and the vehicle 12 is in operation. It should be understood that the vehicle operation sensors 14 listed above are merely examples, and that any suitable sensor that indicates that the vehicle 12 is in operation is contemplated as a vehicle operation sensor 14.

In certain embodiments, the vehicle 12 may also include one or more driver condition sensors 28 that facilitate determining conditions of the member 26 while operating the vehicle 12. For example, in certain embodiments, a driver condition sensor 28 may include a pulse detection sensor 30 in a steering wheel 32 of the vehicle 12 that may measure a pulse of the member 26. As another example, the driver condition sensor 28 may include a biometric or occupancy sensor 34 in a driver's seat 36 of the vehicle 12 that may sense biometric information of the member 26, such as the pulse of the member 26. In certain embodiments, a driver condition sensor 28 may include an eye or head detection sensor (e.g., a camera) in a windshield 40, in a mirror 42, or mounted on a dashboard 44 of the vehicle 12, that may determine eye focus or head movement or direction of the member 26. In other embodiments, a driver condition sensor 28 may not be integrated into the vehicle 12. For example, a driver condition sensor 28 may include a pulse detection sensor 30 or other biometric sensor of a mobile electronic device 24 (e.g., a wearable electronic device) or a camera 38 or eye or head detection sensor of a mobile electronic device 24 (e.g., a smartphone). In certain embodiments, a driver condition sensor 28 may also be used as a vehicle operation sensor 14. For example, the rear facing camera 38 may be used both to determine that the vehicle 12 is in operation as a vehicle operation sensor 14 and to determine a condition of the member 26 while operating the vehicle 12.

In certain embodiments, the mobile electronic device 24 may include any suitable electronic device that may communicate information to the member 26 via, for example, a communication network, such as a smartphone, a wearable electronic device, a computing device, a laptop, a tablet, a vehicle operation tracking device (such as those used by insurance companies), and so forth. For example, the mobile electronic device 24 may be used to communicate information to the member 26 relating to assessment and improvement of driving habits of the member 26, such as by alerting the member 26 of suggested adjustments to current driving habits, offering alternatives to operating the vehicle 12 (e.g., providing contact information for ride-sharing services, public transportation services, and so forth), incentivizing the member 26 to operate the vehicle 12 in certain ways and/or to not operate the vehicle 12 under circumstances that are not ideal for the member 26 such as when the member 26 is sleepy, intoxicated, or otherwise impaired (e.g., via offering discounts associated with auto insurance, products, services, or gamification), penalizing the member 26 when they are operating the vehicle 12 poorly and/or operating the vehicle 12 under circumstances that are not ideal for the member 26 such as when the member 26 is sleepy, intoxicated, or otherwise impaired (e.g., via increasing payments associated with auto insurance or gamification, contacting a person familiar with the member 26 such as a parent or employer, contacting a call center, and/or warning nearby drivers or autonomous vehicles), as described in greater detail herein.

In addition, in certain embodiments, the vehicle 12 may include a vehicle control system 46 that controls operation of the vehicle 12. In certain embodiments, the vehicle control system 46 may collect data from vehicle operation sensors 14, the mobile electronic device 24, the driver condition sensors 28, the rear facing cameras 38, and so forth, for use by a member assessment and improvement system 48, as described in greater detail herein. In addition, in certain embodiments, operating parameters of the vehicle 12 may be controlled by the vehicle control system 46 based on commands transmitted to the vehicle control system 46 by the member assessment and improvement system 48, as described in greater detail herein.

Figure 2:
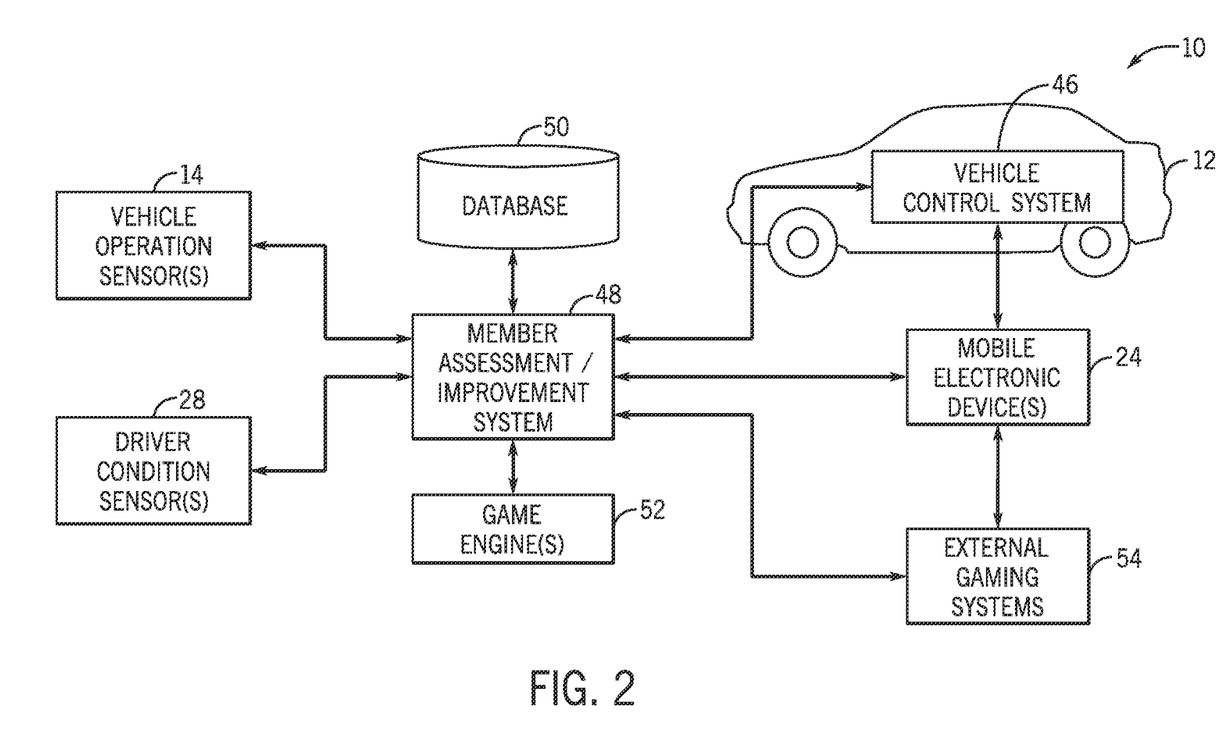
FIG. 2 illustrates a block diagram of the system in which the member assessment and improvement system may receive data that may be used to assess the ability and performance of a member to drive a vehicle, and provide incentivization to the member to improve the ability and the performance of the member in a gamified manner, in accordance with embodiments of the present disclosure.

FIG. 2 illustrates a block diagram of the system 10 in which the member assessment and improvement system 48 may receive data that may be used to assess the ability and performance of a member 26 to drive a vehicle 12, and provide incentivization to the member 26 to improve the ability and the performance of the member 26 in a gamified manner, as described in greater detail herein. As illustrated, the member assessment and improvement system 48 may receive data from various sources. For example, in certain embodiments, the member assessment and improvement system 48 may receive data relating to operating parameters of a vehicle 12 from one or more vehicle operation sensors 14 of the vehicle 12. In addition, in certain embodiments, the member assessment and improvement system 48 may receive data relating to conditions of a member 26 driving the vehicle 12 from one or more driver condition sensors 28. In addition, in certain embodiments, the member assessment and improvement system 48 may receive data relating to control commands for the vehicle 12 from a vehicle control system 46 of the vehicle 12. In addition, in certain embodiments, the member assessment and improvement system 48 may receive data from a mobile electronic device 24 associated with the member 26 driving the vehicle 12. Each of these types of data, as well as other data, may be used by the member assessment and improvement system 48 to assess the ability and performance of the member 26 driving the vehicle 12, as described in greater detail herein.

The member assessment and improvement system 48 and the mobile electronic devices 24 described herein may include any suitable computing device such as a general-purpose computer, a mobile computing device, a laptop-computing device, a tablet computing device, a wearable computing device, and so forth. As described in greater detail herein, the member assessment and improvement system 48 may also store information regarding any determinations made by or data acquired by the member assessment and improvement system 48 in one or more databases 50. For example, the member assessment and improvement system 48 may store the data acquired from one or more vehicle operation sensors 14 of a vehicle 12, one or more driver condition sensors 28, a vehicle control system 46 of the vehicle 12, a mobile electronic device 24 associated with a member 26 driving the vehicle 12, and so forth, as described in greater detail herein. In addition, in certain embodiments, the member assessment and improvement system 48 may utilize one or more game engines 52, which provide certain rules and processes that help the member assessment and improvement system 48 gamify the driving assessment and improvement described in greater detail herein. In addition, in certain embodiments, the member assessment and improvement system 48 may communicate and coordinate with one or more external gaming systems 54, such as online video games, video game platforms, video game services, and so forth, to provide cross-platform gaming functionalities between the member assessment and improvement system 48 and the one or more external gaming systems 54, as described in greater detail herein.

In addition, in certain embodiments, other types of member assessment and improvement may be implemented by the member assessment and improvement system 48 in addition to, or instead of, the driver assessment and improvement described herein. For example, performance of certain driving tasks may be associated with performance of other types of tasks, such as financial planning, periodic maintenance of property for insurance reasons, and so forth, such that games may be provided by the member assessment and improvement system 48 that incentivize both better driving habits as well as other desirable habits. Indeed, as described in greater detail herein, in certain embodiments, the gamification of incentivization of desirable driving habits may be coupled with the gamification of incentivization of the other type of tasks, such as financial planning, periodic maintenance of property for insurance reasons, and so forth, in a unified manner such that the games that members 26 take part in consider all of the various types of incentivization together. For example, certain gamified achievements with respect to certain types of personal behavior may be counterbalanced by certain deficiencies with respect to other types of personal behavior.

For example, in certain embodiments, the member assessment and improvement system 48 may implement a "beat the machine" game, which may be a game that challenges a member 26 to perform certain driving tasks better than a hypothetical, simulated (e.g., artificial intelligence) driver. For example, in certain embodiments, self-driving vehicles could be scored for defensive driving activities, and members 26 could be challenged to beat scores of the self-driving vehicles. In other embodiments, members 26 may compete against other members 26 for similar driving tasks. In addition, in certain embodiments, certain groups of members 26 may compete against other groups of members 26 for similar driving tasks. In addition, in certain embodiments, randomized, periodic objectives may be presented to members 26, such as "try to keep your miles per gallon usage over 24 for the next 10 minutes." In certain embodiments, a graphical indication of the driving performance of a particular member 26 (e.g., presented via a game application running on a mobile electronic device 24 associated with the member 26) may incentivize good driving performance by the member 26.

In addition, in certain embodiments, the member assessment and improvement system 48 may implement a total point accrual or countdown whereby certain driving tasks may be assigned total point values and members 26 can increase or decrease the total points available as driving tasks are completed in a particular way. For example, in certain embodiments, upon identifying a particular route, the member assessment and improvement system 48 may identify particular point assignments based upon characteristics of the route (e.g., speed limits, number of stop signs, number of cars currently on the route, and so forth) that, if the member 26 performs certain driving tasks along the route, the member 26 may earn points according to the characteristics of the route. In certain embodiments, as the member 26 performs safe driving, points may be accumulated toward the total points. Alternatively, in certain embodiments, as the member 26 performs unsafe driving habits, points may be decremented from the total points. In certain embodiments, members 26 may compete against other members 26 based on a comparison of total points. In addition, in certain embodiments, certain groups of members 26 may compete against other groups of members 26 based on a comparison of total points. In certain embodiments, a graphical indication of these point adjustments (e.g., presented via a game application running on a mobile electronic device 24 associated with the member 26) may incentivize good driving habits.

In addition, in certain embodiments, the member assessment and improvement system 48 may implement a "grow a nest egg" game, which may be part of a game allowing members 26 to grow a virtual nest egg by completing certain tasks. For example, in certain embodiments, actions related to financial readiness (e.g., staying within predetermined budgets, saving certain amounts of money, and so forth) may be used by members 26 to "hatch" eggs related to finance, actions related to home ownership/domicile patterns (e.g., performing maintenance on appliances and other household property) may be used by members 26 to "hatch" eggs related to home owners/renters insurance, and/or good driving habits may be used by members 26 to "hatch" driving insurance eggs. Once hatched, additional actions relating to these eggs may be performed by members 26 to sustain "eagles" in a virtual nest. In addition, as described in greater detail herein, in certain embodiments, the virtual nest eggs may be grown based on a combination of each of the various types of personal habits.

In addition, in certain embodiments, the member assessment and improvement system 48 may provide badge-based incentivization by awarding electronic badges for completing certain tasks including, but not limited to, actions related to financial readiness, actions related to home ownership/domicile patterns, good diving habits, and so forth, or some combination thereof, as described in greater detail herein. In certain embodiments, the tasks may include sensitive information, so the member assessment and improvement system 48 may anonymize the awards via an avatar associated with the member 26 or provide an externally-viewable award that is not as descriptive as the mission descriptions (e.g., which would necessarily be detailed enough for completion of the task). In addition, in certain embodiments, the member assessment and improvement system 48 may simply provide a percentile (e.g. Top 15%) that the member 26 is in. Indeed, in such embodiments, goals could be "Get into the Top 10%", etc.

In addition, in certain embodiments, the member assessment and improvement system 48 may provide color-coded incentivization by using different colors to emphasize levels of conformance with regard to recommendations relating to actions related to financial readiness, actions related to home ownership/domicile patterns, good diving habits, and so forth, or some combination thereof, as described in greater detail herein. For example, in certain embodiments, a "Gold" house may be awarded upon reaching a top threshold of recommended actions by a member 26 (e.g., a homeowner/renter). In addition, in certain embodiments, a house could have a plurality of appliances, for example, that may be laid out in a three-dimensional rendition of the house, and performing periodic maintenance on the appliances could bring the house to a higher condition, eventually leading to "Gold" status for the house. In certain embodiments, a camera and/or other sensors in a mobile electronic device 24 could be used to detect a three-dimensional model of the house and/or detect the existence of certain appliances and so forth in the house.

Figure 3:
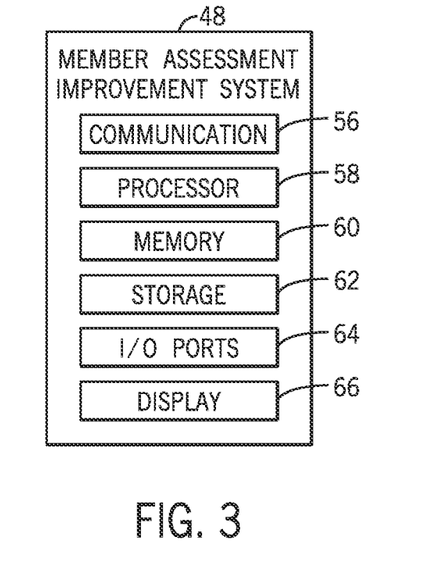
FIG. 3 is a block diagram of example components of the member assessment and improvement system, in accordance with embodiments of the present disclosure.

To perform the driving assessment and improvement functions described herein, the member assessment and improvement system 48 may include certain components to facilitate these functions. FIG. 3 is a block diagram of example components of the member assessment and improvement system 48. For example, in certain embodiments, the member assessment and improvement system 48 may include a communication interface 56, one or more processors 58, memory media 60, storage media 62, input/output (I/O) ports 64, a display 66, and so forth. The communication interface 56 of the member assessment and improvement system 48 may be a wireless or wired communication interface that may facilitate communication between the member assessment and improvement system 48, one or more vehicle operation sensors 14 of a vehicle 12, one or more driver condition sensors 28, a vehicle control system 46 of the vehicle 12, a mobile electronic device 24 associated with a member 26 driving the vehicle 12, one or more databases 50, one or more game engines 52, and so forth, as described in greater detail herein.

The one or more processors 58 of the member assessment and improvement system 48 may be any type of computer processor or microprocessor capable of executing computer-executable code to perform the operations described in greater detail herein. The memory media 60 and the storage media 62 of the member assessment and improvement system 48 may be any suitable articles of manufacture that can serve as media to store processor-executable code, data, or the like. These articles of manufacture may represent computer-readable media (e.g., any suitable form of memory or storage) that may store the processor-executable code used by the one or more processors 58 to perform the operations described in greater detail herein. The memory media 60 and the storage media 62 may also be used to store data, various other software applications for analyzing the data, and the like. The memory media 60 and the storage media 62 may represent non-transitory computer-readable media (e.g., any suitable form of memory or storage) that may store the processor-executable code used by the one or more processors 58 to perform various techniques described herein. It should be noted that non-transitory merely indicates that the media is tangible and not a signal.

The I/O ports 64 of the member assessment and improvement system 48 may be interfaces that may couple to other peripheral components such as input devices (e.g., keyboard, mouse), sensors, input/output (I/O) modules, and the like. The display 66 of the member assessment and improvement system 48 may operate to depict visualizations associated with software or executable code being processed by the one or more processors 58. In certain embodiments, the display 66 may be a touch display capable of receiving inputs from a user of the member assessment and improvement system 48. The display 66 may be any suitable type of display, such as a liquid crystal display (LCD), plasma display, or an organic light emitting diode (OLED) display, for example. Additionally, in certain embodiments, the display 66 may be provided in conjunction with a touch-sensitive mechanism (e.g., a touch screen) that may function as part of a control interface for the member assessment and improvement system 48.

It should be noted that the components described above with regard to the member assessment and improvement system 48 are exemplary components, and the member assessment and improvement system 48 may include additional or fewer components as shown. Additionally, it should be noted that the mobile electronic devices 24 and the vehicle control systems 46 described herein may also include similar components as described as part of the member assessment and improvement system 48.

Figure 4:
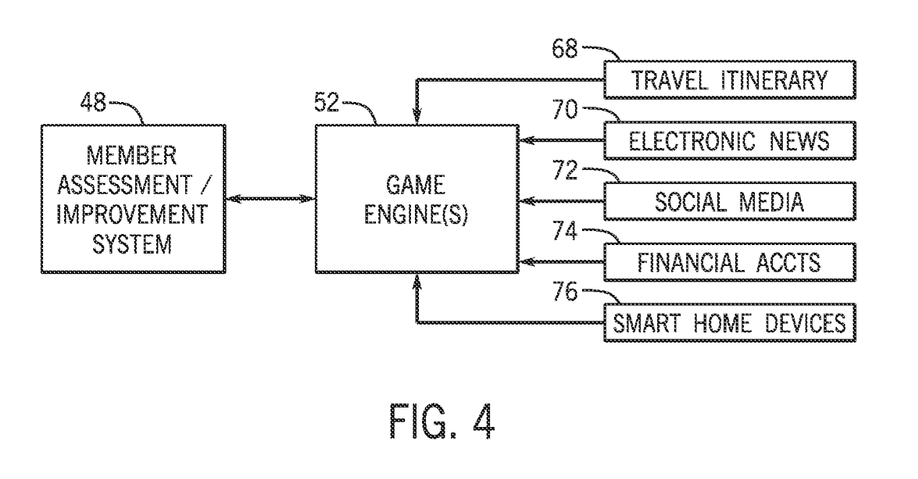
FIG. 4 illustrates game engines that may be used by the member assessment and improvement system and utilize various other types of external data, in accordance with embodiments of the present disclosure.

As illustrated in FIG. 4, the one or more game engines 52 used by the member assessment and improvement system 48 may utilize various other types of external data in order to implement the games described herein. For example, in certain embodiments, travel itinerary data 68, which includes information regarding locations in which a member 26 may be traveling, may be used by the one or more game engines 52 and/or the member assessment and improvement system 48. The travel itinerary data 68 may be acquired by mining data sources such as emails, text messages, electronic calendar items, and so forth. In certain embodiments, the travel itinerary data 68 may be directly input into the one or more game engines 52 and/or the member assessment and improvement system 48 as a component of a mapping program that provides a recommended route (e.g., a route for a vehicle 12) to a destination. In certain embodiments, the member assessment and improvement system 48 may adjust the generated route based on the analysis described below. In certain embodiments, the one or more game engines 52 and/or the member assessment and improvement system 48 may be associated with a travel services organization that may assist a member 26 in scheduling the itinerary for an upcoming trip. The travel services organization may thus provide the travel itinerary data 68.

In addition, in certain embodiments, electronic news sources 70, which include various news services that may be updated in real time or substantially real time via a network (e.g., Internet) may be used by the one or more game engines 52 and/or the member assessment and improvement system 48. The electronic news sources 70 may provide information regarding weather alerts, natural disaster alerts, non-natural disaster alerts (e.g., traffic, active shooter, and so forth), and any other information that may be published via an electronic news outlet such as a webpage, news database, and so forth.

In addition, in certain embodiments, social media 72, which includes data available via social media sites such as Facebook®, Twitter®, and so forth, may be used by the one or more game engines 52 and/or the member assessment and improvement system 48. In certain embodiments, the social media 72 may be associated with a member 26 employing the member assessment and improvement system 48 described herein. For example, in certain embodiments, social media 72 associated with a location of a member 26 or a destination of the member 26 may be considered. In addition, in certain embodiments, social media 72 may also include data trending on social media sites that may not be directly associated with the particular member 26. In certain embodiments, data from the social media 72 may include information regarding a natural disaster, dangerous situation (e.g., active shooter), and so forth. In certain embodiments, the social media 72 may include crowd source data that is updated in substantially real time. It will be appreciated that, although the crowd source data may not be verified by news sources, it can often provide information related to a disruptive event (e.g., active shooter, accident) more quickly than certain electronic news sources.

Each of the external data sources 68, 70, 72 illustrated in FIG. 4 may be used by the one or more game engines 52 and/or the member assessment and improvement system 48 to determine a location of a member 26, a destination of the member 26, a current route being followed by the member 26, and so forth, to determine goals, challenges, and so forth, for a game being hosted by the one or more game engines 52 and/or the member assessment and improvement system 48. For example, knowing where a particular member 26 currently is, where the particular member 26 is currently headed, and how the particular member 26 currently plans on traveling from their current location to their current destination may enable the one or more game engines 52 and/or the member assessment and improvement system 48 to generate various goals, challenges, and so forth, that may potentially improve the driving habits of the particular member 26.

In addition, in certain embodiments, the one or more game engines 52 used by the member assessment and improvement system 48 may also utilize data from various financial accounts 74 such as bank accounts, financial savings accounts, budgeting software, and so forth, to enable assessment of financial readiness of members 26 for certain games hosts by the one or more game engines 52. In addition, in certain embodiments, the one or more game engines 52 used by the member assessment and improvement system 48 may also utilize data from various smart homes devices 76 and/or other sensors to enable assessment of home ownership/domicile patterns of members 26 for certain games hosts by the one or more game engines 52.

In certain embodiments, the smart home devices 76 may be configured to automatically collect data relating to home ownership/domicile patterns at various time intervals, independent of any particular human intervention. As illustrated in FIG. 1, in certain embodiments, the smart home devices 76 may include, but are not limited to, one or more of the following:

- smart appliances, such as washers, dryers, refrigerators, ovens, dishwashers, and so forth;
- home entertainment systems, such as televisions, audio systems, game consoles, media players, and so forth;
- in-home control systems, such as garage door openers, alarm systems, security systems (e.g., security lights, security cameras, locks, and so forth), safety systems (e.g., smoke detectors, carbon monoxide detectors, and so forth), and other smart home systems (e.g., windows, chimney flues, and so forth);

lighting devices, such as lamps, fixtures, and so forth;
utility systems that provide and/or control electric power, natural gas, water, sewage, heating, ventilation, and air conditioning (HVAC), network access, and so forth, such as HVAC units, thermostats, vents, water meters, water heaters, gas meters, electrical switch boxes, circuit breaker boxes, and so forth; and/or
portable or less portable computing devices, such as smart phones, tablet computers, electronic book readers, laptop computers, desktop computers, wearable computing devices, television set-top boxes, in-vehicle automotive computers or telematics devices, and so forth.

In certain embodiments, characteristics relating to home ownership/domicile patterns may be determined based at least in part on data received from one or more smart home devices 76 disposed in or around a property (e.g., domicile), such as smart appliances, home entertainment systems, in-home control systems, lighting devices, utility systems, portable or less portable computing devices, and so forth. For example, in certain embodiments, the one or more smart home devices 76 may include cameras that may capture images in or around a property, which may be used to determine characteristics relating to home ownership/domicile patterns. In addition, in certain embodiments, the one or more smart home devices 76 may be specifically configured to monitor usage information, such as water usage, electricity usage, changes in temperature, and so forth, occurring at certain locations relative to the property, which may be used to correlate to characteristics relating to home ownership/domicile patterns. In certain embodiments, when multiple types of data (e.g., from multiple different smart home devices 76) are used, a confidence level pertaining to the determination may be automatically adjusted based on whether the different types of data appear to verify each other (i.e., positive adjustment to the confidence level) or contradict each other (i.e., negative adjustment to the confidence level).

Figure 5:
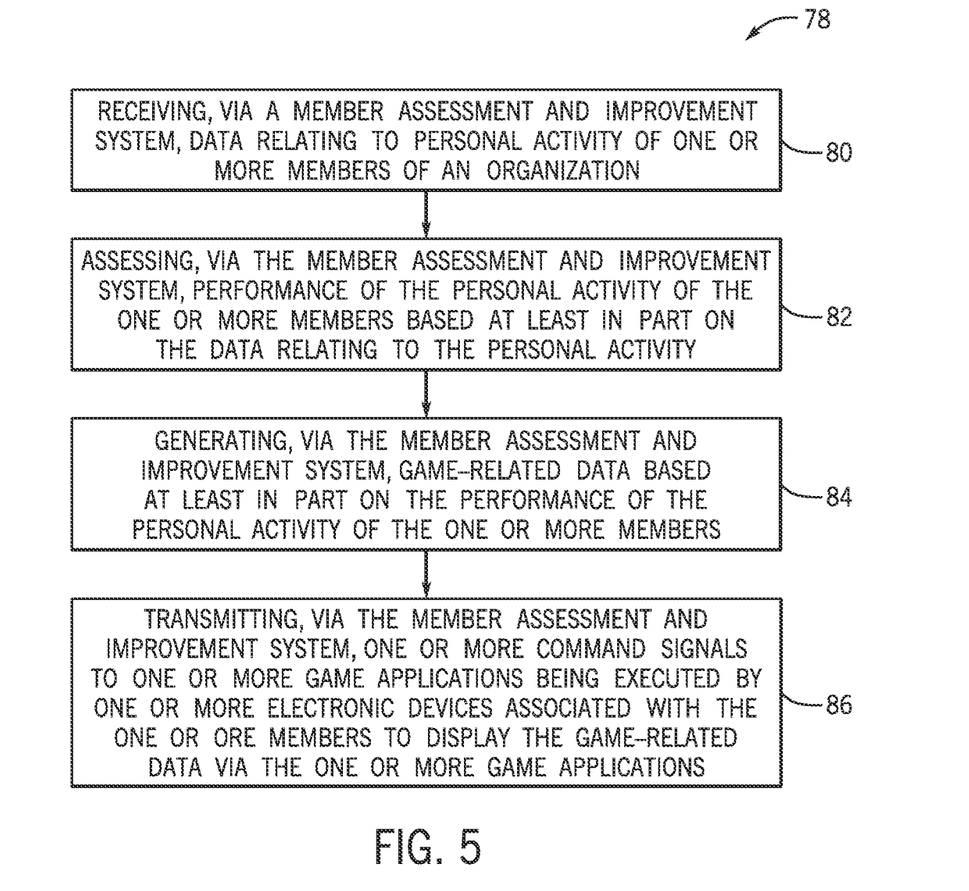
FIG. 5 is a flow diagram of a method of using the member assessment and improvement system, in accordance with embodiments of the present disclosure.

FIG. 5 is a flow diagram of a method 78 of using the member assessment and improvement system 48 described in greater detail herein. As illustrated, in certain embodiments, the method 78 may include receiving, via the member assessment and improvement system 48, data relating to personal activity of one or more members 26 of an organization (block 80). For example, in certain embodiments, the personal activity of the one or more members 26 may include one or more actions related to financial readiness of the one or more members 26, one or more actions related to home ownership/domicile patterns of the one or more members 26, driving activity of the one or more members 26, or any other personal activity that may be assessed and improved by the member assessment and improvement system 48 in a gamified manner, as described in greater detail herein.

In addition, in certain embodiments, each of the types of personal activity may be assessed and improved by the member assessment and improvement system 48 in a gamified manner in combination with other types of personal activity. As but one non-limiting example, driving activity and financial readiness of one or more members 26 may be assessed at the same time in a particular game such that the member assessment and improvement system 48 may attempt to improve both types of personal activity for the one or more members 26 simultaneously. For example, scoring for each of a plurality of different types of personal activity may be combined by the member assessment and improvement system 48. In addition, in certain embodiments, certain types of personal activity may be randomly added to an existing game based on various factors, such as when the member 26 is (or is not) already scoring particularly well with another type of personal activity in the existing game. In addition, in certain embodiments, scoring relating to different types of personal activity may be weighted by the member assessment and improvement system 48 based on a relative importance between the types of personal activity. In addition, in certain embodiments, scoring relating to different types of personal activity may be multiplied together (e.g., as opposed to adding to or subtracting from each other) by the member assessment and improvement system 48 such that combined performance between multiple different types of personal activity (as opposed to focusing on one or the other) is incentivized. In addition, in certain embodiments, a member 26 may select a subset of a plurality of different types of personal activity that are available for a particular game such that the member 26 can utilize a risk/reward strategy between which types of personal activity they believe they can perform better at for a particular game.

In addition, in certain embodiments, the method 78 may include assessing, via the member assessment and improvement system 48, performance of the personal activity of the one or more members 26 based at least in part on the data relating to the personal activity (block 82). In addition, in certain embodiments, the method 78 may include generating, via the member assessment and improvement system 48, game-related data based at least in part on the performance of the personal activity of the one or more members 26 (block 84). In addition, in certain embodiments, the method 78 may include transmitting, via the member assessment and improvement system 48, one or more command signals to one or more game applications being executed by one or more electronic devices 24 associated with the one or more members 26 to display the game-related data via the one or more game applications (block 86).

In certain embodiments, the game-related data may include data relating to point values associated with one or more personal tasks performed by the one or more members 26, as described in greater detail herein. In addition, in certain embodiments, the game-related data may include data relating to virtual nest eggs earned based at least in part on the personal activity, as described in greater detail herein. In addition, in certain embodiments, the game-related data may include data relating to one or more badges earned by the one or more members based at least in part on the personal activity, as described in greater detail herein. In addition, in certain embodiments, the game-related data may include data relating to color-coding associated with the personal activity, as described in greater detail herein.

In addition, in certain embodiments, the game-related data may include data relating to a comparison of the personal activity to simulated personal activity of a simulated member, as described in greater detail herein. In addition, in certain embodiments, the game-related data may include data relating to a comparison of the personal activity to similar personal activity of other members of the one or more members 26, as described in greater detail herein.

In addition, in certain embodiments, the member assessment and improvement system 48 may be configured to transmit the game-related data to one or more external gaming systems 54 such as online video games, video game platforms, video game services, or some combination thereof, as described in greater detail herein. For example, game-related data for games hosted by the one or more game engines 52 and/or the member assessment and improvement system 48 may be carried over into external video games executed on video game consoles such that cross-pollination between the games hosted by the one or more game engines 52 and/or the member assessment and improvement system 48 and the video games being executed on the video game consoles. For example, in certain embodiments, results of games hosted by the one or more game engines 52 and/or the member assessment and improvement system 48 may take the form of rewards (e.g., points, levels, temporary game-related abilities, and so forth) within the external video games executed on video game consoles, and vice versa. It will be appreciated that, in order to integrate content from the games hosted by the one or more game engines 52 and/or the member assessment and improvement system 48 into the video games executed on the video game consoles may require the one or more game engines 52 and/or the member assessment and improvement system 48 to transform certain data into formats suitable for usage by external video game platforms to enable the video games executed on the video game consoles to present the data relating to the personal activity that is part of the games being hosted by the one or more game engines 52 and/or the member assessment and improvement system 48. By carrying the game-related data related to performance of the personal activity tasks described herein over to external gaming systems 54, it is believed that the members 26 may be even further incentivized to effectively perform the personal activity tasks insofar as doing so may generate tangible beneficial effects in such external gaming systems 54, which may be very important to the members 26.

Figure 6:
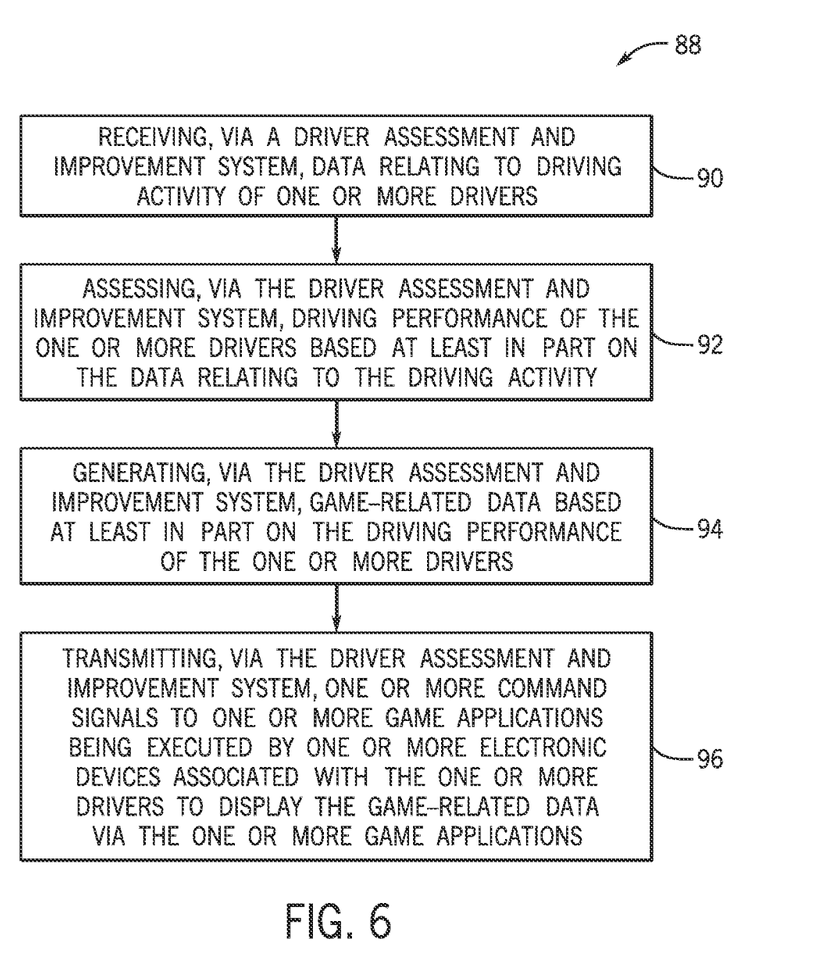
FIG. 6 is a flow diagram of another method of using the member assessment and improvement system, in accordance with embodiments of the present disclosure.

As described in greater detail herein, all of the different types of personal activity may be assessed and improved collectively (e.g., by considering multiple different types of personal activity together) by the member assessment and improvement system 48. However, in certain embodiments, the primary personal activity assessed and improved by the member assessment and improvement system 48 may be driving activity of the members (e.g., as drivers 26). To that end, FIG. 6 is a flow diagram of another method 88 of using the member assessment and improvement system 48 described in greater detail herein (e.g., as a driver assessment and improvement system 48). As illustrated, in certain embodiments, the method 88 may include receiving, via the driver assessment and improvement system 48, data relating to driving activity of one or more drivers 26 (block 90). For example, in certain embodiments, the data relating to the driving activity of the one or more drivers 26 may be received by the driver assessment and improvement system 48 from one or more vehicle operation sensors 14 associated with one or more vehicles 12 being driven by the one or more drivers 26, as described in greater detail herein. In addition, in certain embodiments, the data relating to the driving activity of the one or more drivers 26 may be received by the driver assessment and improvement system 48 from vehicle control systems 46 of one or more vehicles 12 being driven by the one or more drivers 26, as described in greater detail herein. In addition, in certain embodiments, the data relating to the driving activity of the one or more drivers 26 may be received by the driver assessment and improvement system 48 from one or more driver condition sensors 28.

In addition, in certain embodiments, the method 88 may include assessing, via the driver assessment and improvement system 48, driving performance of the one or more drivers 26 based at least in part on the data relating to the driving activity (block 92). In addition, in certain embodiments, the method 88 may include generating, via the driver assessment and improvement system 48, game-related data based at least in part on the driving performance of the one or more drivers 26 (block 94). In addition, in certain embodiments, the method 88 may include transmitting, via the driver assessment and improvement system 48, one or more command signals to one or more game applications being executed by one or more electronic devices 24 associated with the one or more drivers 26 to display the game-related data via the one or more game applications (block 96).

In addition, in certain embodiments, the method 88 may include comparing, via the driver assessment and improvement system 48, the driving activity of the one or more drivers 26 to simulated driving activity of a simulated driver, as described in greater detail herein. In such embodiments, the method 88 may include periodically transmitting, via the driver assessment and improvement system 48, one or more objective-based command signals to the one or more game applications being executed by the one or more electronic devices 24 associated with the one or more drivers 26 to display one or more randomized driving objectives via the one or more game applications, as described in greater detail herein. In addition, in such embodiments, the comparison of the driving activity to the simulated driving activity of the simulated driver performed by the driver assessment and improvement system 48 may directly relate to the one or more randomized driving objectives, as described in greater detail herein.

In addition, in certain embodiments, the method 88 may include generating, via the driver assessment and improvement system 48, the game-related data based at least in part on data relating to financial readiness of the one or more drivers 26, data relating to home ownership of the one or more drivers 26, or some combination thereof, as described in greater detail herein. In addition, in certain embodiments, the method 88 may include transmitting, via the driver assessment and improvement system, the game-related data to one or more external gaming systems comprising online video games, video game platforms, video game services, or some combination thereof. For example, game-related data for games hosted by the one or more game engines 52 and/or the member assessment and improvement system 48 may be carried over into external video games executed on video game consoles such that cross-pollination between the games hosted by the one or more game engines 52 and/or the member assessment and improvement system 48 and the video games being executed on the video game consoles. It will be appreciated that, in order to integrate content from the games hosted by the one or more game engines 52 and/or the member assessment and improvement system 48 into the video games executed on the video game consoles may require the one or more game engines 52 and/or the member assessment and improvement system 48 to transform certain data into formats suitable for usage by external video game platforms to enable the video games executed on the video game consoles to present the data relating to the personal activity that is part of the games being hosted by the one or more game engines 52 and/or the member assessment and improvement system 48. As described in greater detail herein, by carrying the game-related data related to performance of the personal activity tasks described herein over to external gaming systems 54, it is believed that the drivers 26 may be even further incentivized to effectively perform the driving activity tasks insofar as doing so may generate tangible beneficial effects in such external gaming systems 54, which may be very important to the drivers 26.

In certain embodiments, the game-related data may include data relating to a comparison of the driving activity to similar driving activity of other drivers 26 of the one or more drivers 26, as described in greater detail herein. In addition, in certain embodiments, the game-related data may include data relating to point values associated with one or more driving tasks performed by the one or more drivers 26, as described in greater detail herein. In addition, in certain embodiments, the game-related data may include data relating to one or more badges earned by the one or more drivers 26 based at least in part on the driving activity, as described in greater detail herein.

Figure 7:
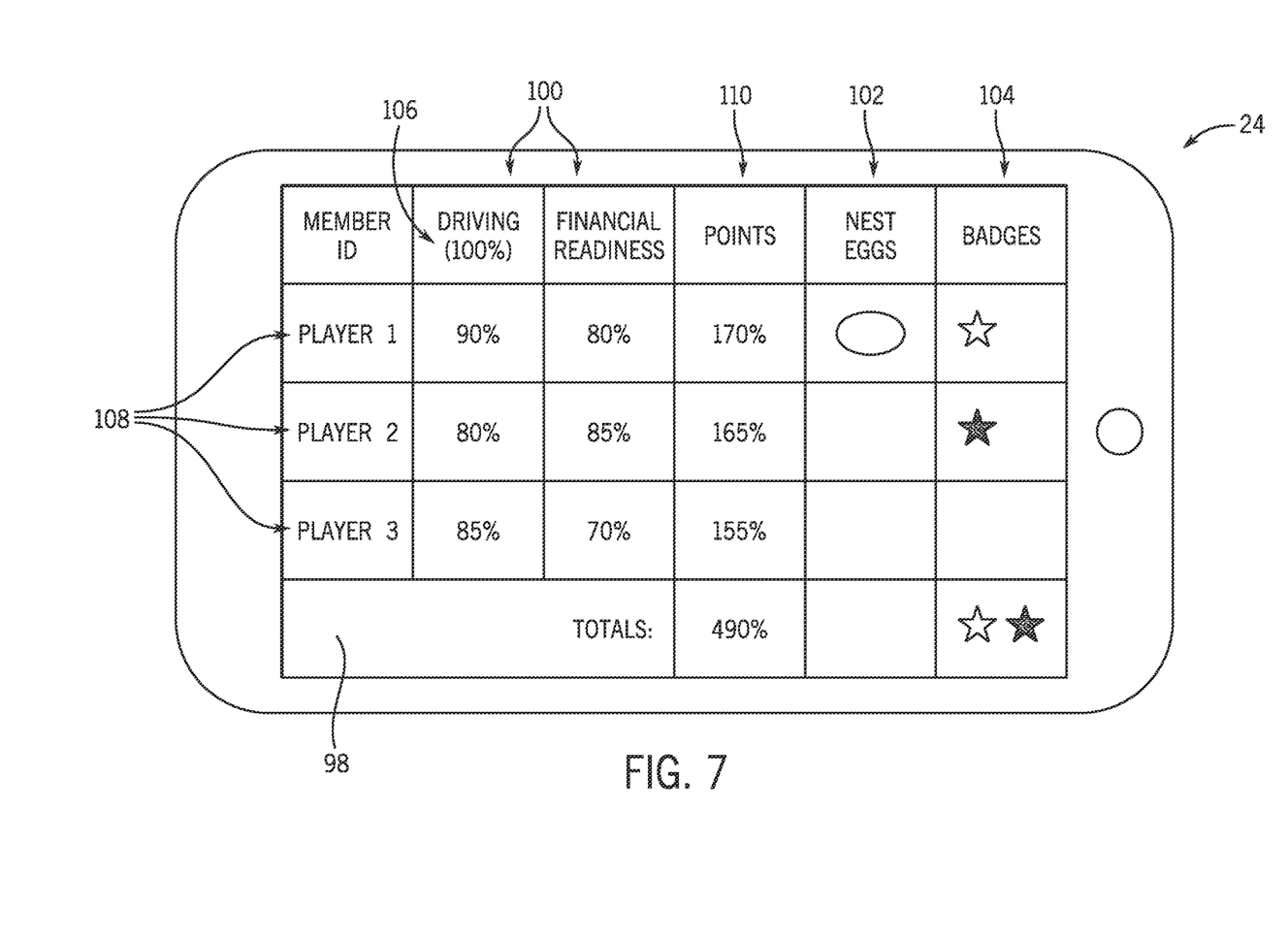
FIGS. 7 and 8 illustrate various game-related data that may be presented to members via game applications being executed by electronic devices associated with the members, in accordance with embodiments of the present disclosure.

FIG. 7 illustrates various game-related data that may be presented to members 26 via game applications 98 being executed by electronic devices 24 associated with the members 26. As illustrated, in certain embodiments, the game-related data may include data relating to point values 100 associated with personal tasks performed by the members 26, as described in greater detail herein. In addition, in certain embodiments, the game-related data may include virtual nest eggs 102 earned by the members 26 based at least in part on the personal activity, as described in greater detail herein. In addition, in certain embodiments, the game-related data may include data relating to badges 104 earned by the members 26 based at least in part on the personal activity, as described in greater detail herein. In addition, in certain embodiments, the game-related data may include data relating to color-coding (e.g., differently colored badges 104) associated with the personal activity, as described in greater detail herein.

In addition, in certain embodiments, the game-related data may include data relating to a comparison 106 of the personal activity to simulated personal activity of a simulated member, as described in greater detail herein. In addition, in certain embodiments, the game-related data may include data relating to a comparison 108 of the personal activity to similar personal activity of other members of the members 26, as described in greater detail herein.

Figure 8:
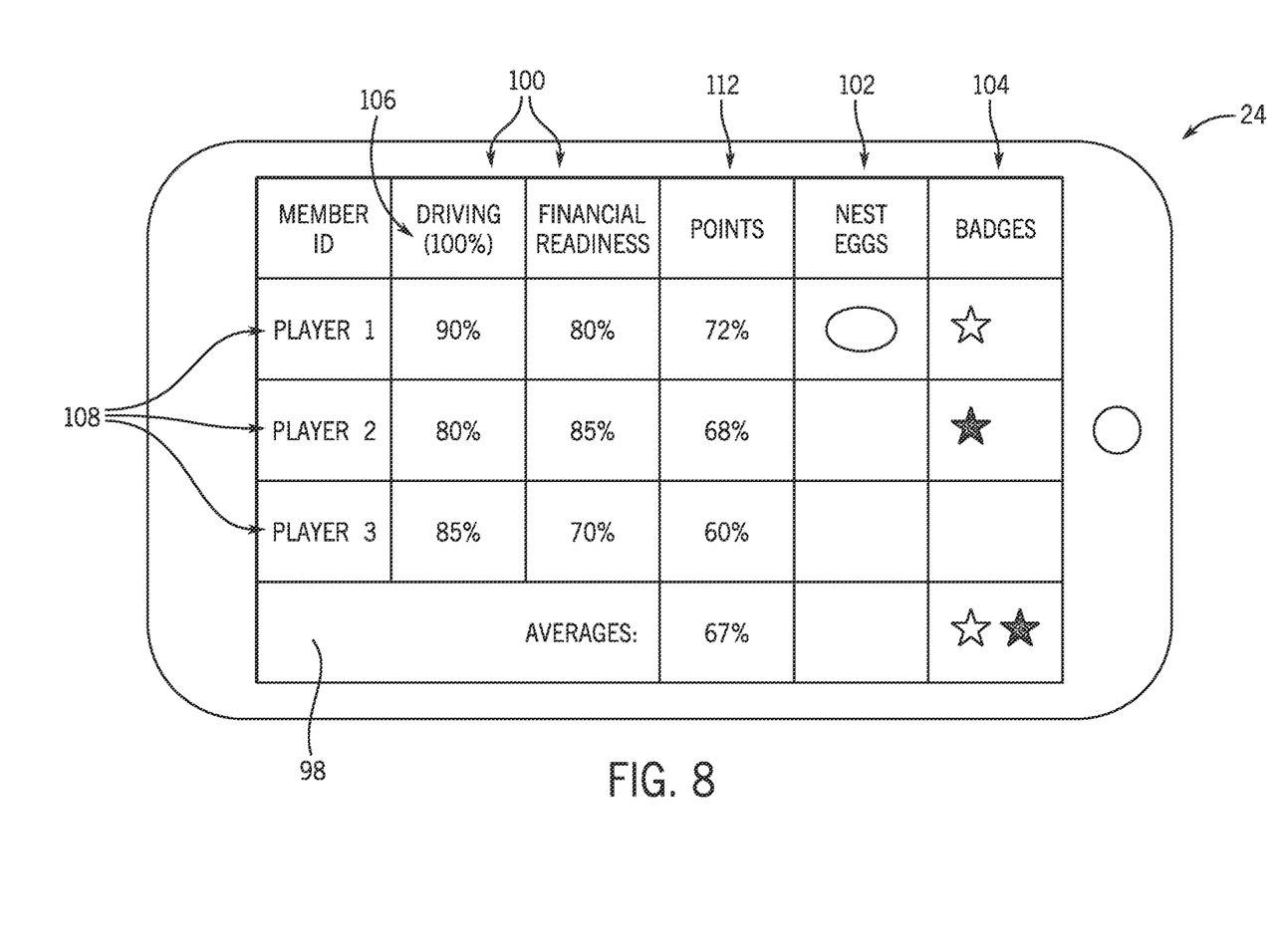

As illustrated in FIG. 7, in certain embodiments, multiple types of personal activity may be assessed and improved in a gamified manner in combination with each other. As but one non-limiting example, driving activity and financial readiness of members 26 may be assessed at the same time in a particular game such that the member assessment and improvement system 48 may attempt to improve both types of personal activity for the members 26 simultaneously. For example, in the embodiment illustrated in FIG. 7, scoring for each of a plurality of different types of personal activity may be combined 110. In certain embodiments, scoring relating to the different types of personal activity may be weighted based on a relative importance between the types of personal activity. In addition, as illustrated in FIG. 8, in certain embodiments, scoring relating to different types of personal activity may be multiplied together 112 (e.g., as opposed to adding to or subtracting from each other) by the member assessment and improvement system 48 such that combined performance between multiple different types of personal activity (as opposed to focusing on one or the other) is incentivized.

In certain embodiments, the member assessment and improvement system 48 may automatically (e.g., without human intervention) send a control signal to electronic devices 24 associated with certain members 26 to automatically (e.g., without human intervention) launch the game application 98 on the electronic devices 24 when certain updates to a particular game are determined by the member assessment and improvement system 48 to be particularly noteworthy for the members 26 (e.g., when a particular member 26 takes the lead over another member 26 for the particular game). In certain embodiments, communications between the member assessment and improvement system 48 and the electronic devices 24 relating to the games may be done via one or more specific communication channels to minimize the impact that the communications between the member assessment and improvement system 48 and the electronic devices 24 have on other applications running on the electronic devices 24, for example.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A member assessment and improvement system configured to:
   generate data relating to personal activity of one or more members of an organization, wherein the personal activity comprises one or more actions related to home ownership and/or domicile patterns of the one or more members; wherein generating the data relating to the personal activity comprises:
   utilizing one or more cameras to detect data relating to a house owned by the one or more members;
   analyzing the data relating to the house to determine a three-dimensional model of the house and to detect one or more appliances located within the house based at least in part on the three-dimensional model of the house; and
   determining whether one or more maintenance activities are performed for the detected one or more appliances as part of the data relating to the personal activity;
   assess performance of the personal activity of the one or more members based at least in part on the data relating to the personal activity;
   generate game-related data based at least in part on the performance of the personal activity of the one or more members;
   transmit the game-related data to one or more external gaming systems to provide one or more rewards via the one or more external gaming systems based at least in part on the performance of the personal activity of the one or more members, and to provide cross-platform gaming functionalities between the member assessment and improvement system and the one or more external gaming systems; and
   in response to determining one or more updates to the game-related data or the cross-platform gaming functionalities caused by interaction of the one or more members with the member assessment and improvement system or the one or more external gaming systems, transmit one or more command signals to one or more game applications associated with the member assessment and improvement system being executed by one or more electronic devices associated with the one or more members to display the game-related data and the cross-platform gaming functionalities via the one or more game applications.

2. The member assessment and improvement system of claim 1, wherein the personal activity further comprises one or more actions related to financial readiness of the one or more members.

3. The member assessment and improvement system of claim 1, wherein the game-related data comprises data relating to a comparison of the personal activity to simulated personal activity of a simulated member.

4. The member assessment and improvement system of claim 1, wherein the game-related data comprises data relating to a comparison of the personal activity to similar personal activity of other members of the one or more members.

5. The member assessment and improvement system of claim 1, wherein the game-related data comprises data relating to point values associated with one or more personal tasks performed by the one or more members.

6. The member assessment and improvement system of claim 1, wherein the game-related data comprises data relating to virtual nest eggs earned based at least in part on the personal activity.

7. The member assessment and improvement system of claim 1, wherein the game-related data comprises data relating to one or more badges earned by the one or more members based at least in part on the personal activity.

8. The member assessment and improvement system of claim 1, wherein the one or more external gaming systems comprise online video games, video game platforms, video game services, or some combination thereof.

9. A method, comprising:
generating, via a member assessment and improvement system, data relating to personal activity of one or more members of an organization, wherein the personal activity comprises one or more actions related to home ownership and/or domicile patterns of the one or more members; wherein generating the data relating to the personal activity comprises:
utilizing one or more cameras to detect data relating to a house owned by the one or more members;
analyzing the data relating to the house to determine a three-dimensional model of the house and to detect one or more appliances located within the house based at least in part on the three-dimensional model of the house; and
determining whether one or more maintenance activities are performed for the detected one or more appliances as part of the data relating to the personal activity;
assessing, via the member assessment and improvement system, performance of the personal activity of the one or more members based at least in part on the data relating to the personal activity;
generating, via the member assessment and improvement system, game-related data based at least in part on the performance of the personal activity of the one or more members;
transmitting, via the member assessment and improvement system, the game-related data to one or more external gaming systems to provide one or more rewards via the one or more external gaming systems based at least in part on the performance of the personal activity of the one or more members, and to provide cross-platform gaming functionalities between the member assessment and improvement system and the one or more external gaming systems; and
in response to determining one or more updates to the game-related data or the cross-platform gaming functionalities caused by interaction of the one or more members with the member assessment and improvement system or the one or more external gaming systems, transmitting, via the member assessment and improvement system, one or more command signals to one or more game applications associated with the member assessment and improvement system being executed by one or more electronic devices associated with the one or more members to display the game-related data and the cross-platform gaming functionalities via the one or more game applications.

10. The method of claim 9, wherein the personal activity further comprises one or more actions related to financial readiness of the one or more members.

11. The method of claim 9, wherein the game-related data comprises data relating to point values associated with one or more personal tasks performed by the one or more members.

12. The method of claim 9, wherein the game-related data comprises data relating to one or more badges earned by the one or more members based at least in part on the personal activity.

13. The method of claim 9, wherein the one or more external gaming systems comprise online video games, video game platforms, video game services, or some combination thereof.

14. The method of claim 9, wherein the game-related data comprises data relating to a comparison of the personal activity to simulated personal activity of a simulated member.

15. The method of claim 9, wherein the game-related data comprises data relating to a comparison of the personal activity to similar personal activity of other members of the one or more members.

16. The method of claim 9, wherein the game-related data comprises data relating to virtual nest eggs earned based at least in part on the personal activity.

17. The method of claim 9, comprising utilizing, via the member assessment and improvement system, dedicated communication channels to transmit the game-related data and the one or more command signals.

18. The method of claim 9, comprising transforming, via the member assessment and improvement system, data exchanged between the one or more external gaming systems and the one or more game applications into data formats suitable for usage by the one or more external gaming systems and the one or more game applications.

19. The method of claim 9, comprising:
detecting, via one or more sensors, biometric information relating to the one or more members; and
authenticating, via the member assessment and improvement system, the one or more members based on the detected biometric information.

20. One or more non-transitory computer-readable memory media comprising processor-executable instructions stored thereon, wherein the processor-executable instructions, when executed by one or more processors, cause the one or more processors to:
receive data relating to personal activity of one or more members of an organization, wherein the personal activity comprises one or more actions related to home ownership and/or domicile patterns of the one or more members; wherein receiving the data relating to the personal activity comprises:
utilizing one or more cameras to detect data relating to a house owned by the one or more members;
analyzing the data relating to the house to determine a three-dimensional model of the house and to detect one or more appliances located within the house based at least in part on the three-dimensional model of the house; and
determining whether one or more maintenance activities are performed for the detected one or more appliances as part of the data relating to the personal activity;

assess performance of the personal activity of the one or more members based at least in part on the data relating to the personal activity;

generate game-related data based at least in part on the performance of the personal activity of the one or more members;

transmit the game-related data to one or more external gaming systems to provide one or more rewards via the one or more external gaming systems based at least in part on the performance of the personal activity of the one or more members, and to provide cross-platform gaming functionalities between a member assessment and improvement system and the one or more external gaming systems; and in response to determining one or more updates to the game-related data or the cross-platform gaming functionalities caused by interaction of the one or more members with the member assessment and improvement system or the one or more external gaming systems, transmit one or more command signals to one or more game applications associated with the member assessment and improvement system being executed by one or more electronic devices associated with the one or more members to display the game-related data and the cross-platform gaming functionalities via the one or more game applications.

* * * * *